UNITED STATES PATENT OFFICE.

WILLIAM F. DOWNS, OF JERSEY CITY, NEW JERSEY.

LUBRICANT AND PROCESS OF MAKING SAME.

SPECIFICATION forming part of Letters Patent No. 697,996, dated April 22, 1902.

Application filed September 30, 1901. Serial No. 77,144. (No specimens.)

*To all whom it may concern:*

Be it known that I, WILLIAM F. DOWNS, a citizen of the United States, residing in Jersey City, in the county of Hudson and State of New Jersey, have invented a new and useful Improvement in Lubricants, of which the following is a specification.

My invention relates to a new lubricant and the art or process of manufacturing the same.

The new lubricant consists, essentially, of particles of a solid lubricant coated with an oil in which it is insoluble and suspended in an enveloping oil with which the coating-oil is not miscible.

The process of making it consists, first, in subjecting the particles of the solid lubricant to the action of the coating-oil until complex particles, consisting each of a core of the solid lubricant and a shell of oil, are formed, and then suspending the complex particles in an enveloping oil with which the coating-oil is not miscible.

I prefer to use graphite as the solid lubricant employed, and I shall describe my invention as carried out with this material; but any solid lubricant, like mica or talc, which is insoluble in the coating-oil, may be employed in carrying out the invention.

The graphite is first ground or otherwise reduced to a finely-divided state. It is then subjected to the action of a suitable oil, whereby the particles of the graphite become coated with a layer of oil, forming, in effect, a series of compound spheres, of which there is in each instance an inner kernel of graphite and an outer shell or coating of oil. I have found castor-oil suitable for this purpose.

The graphite used should preferably be pure and finely divided, passing readily through a No. 80 mesh screen, or finer, though, of course, coarser qualities may be used, if desired. If the journal to which the complex lubricant is to be applied is close, then the graphite should be of the finer sizes; if the journal is loose or not close, then the coarser graphite may be used. The finer the particles of graphite are the less the specific gravity of the oil-coated particles is, and consequently the more readily they are suspended in the non-miscible enveloping oil. The greater the viscosity of the enveloping oil the greater the retardation to settling. Hence the better suspension.

The quantity of coating-oil necessary to coat a quantity of graphite will be usually about seven per cent., though this depends on the viscosity of the coating-oil and the size of the particles of graphite coated. If sufficient quantity of the coating-oil were used to form drops, they would run together and settle, carrying graphite with them; but if the particles of graphite are merely coated the adhesion of the oil to the particles is greater than its tendency to form drops, and hence when the particles are separated by a non-solvent or non-miscible oil they do not mat or cake on settling and are readily redistributed by agitation.

In coating the graphite the graphite and oil should be heated, when castor-oil is used, to about 100° centigrade. The castor-oil then becomes less viscous and coats the particles of graphite more readily. If too much oil is used, the mixture will be pasty, but if the right proportions are used it will be crumbly. If any other oil than castor-oil is used, the proper temperature to produce the desired result must be ascertained by previous experiment. The particles of graphite having thus been coated with a surface or film of the proper oil, the coated or complex particles are then suspended in the enveloping oil. This is accomplished by stirring or boiling. The body or enveloping oil should preferably be a viscous mineral oil; but any of the blended or compound oils containing a large proportion of mineral oil will do, provided they contain no oil as an ingredient which has a solvent action on or is miscible with the coating-oil. I have found mineral oil of a specific gravity of from 22° to 40° Baumé to be suitable for my purpose. The stirring in of the coated particles should be rapid and should continue until they are thoroughly distributed throughout the enveloping oil. For the best results the final lubricant should not contain more than three per cent. of graphite, and in the less viscous mixtures this proportion may be reduced considerably.

The complex particles of oil-coated graphite will have a lower specific gravity than graphite alone and intermediate between that of graphite and the enveloping oil. Consequently these particles will have only a slight tendency, if any, to sink in the enveloping oil, and when both the coating-oil and enveloping oil are viscous the graphite will practically remain suspended in the mixture. Moreover, if the complex particles do settle they will not mat or cake, because, not being in actual contact one with another, they are readily redistributed throughout the mass of enveloping oil by slight agitation.

The product which I thus make is one which has long been desired—viz., a compound oil and graphite lubricant which will combine the advantages of both classes of lubricants.

I prefer to use castor-oil as the coating-oil and a mineral oil as the enveloping oil.

What I claim as new is—

1. As a new article of manufacture, a lubricant consisting of particles of a solid lubricant coated with an oil in which it is insoluble and suspended in an enveloping oil with which the coating-oil is not miscible.

2. As a new article of manufacture, a lubricant consisting of particles of graphite coated with oil and suspended in an enveloping oil with which the coating-oil is not miscible.

3. As a new article of manufacture, a lubricant consisting of particles of graphite coated with castor-oil, suspended in an enveloping oil with which the castor-oil is not miscible.

4. The process of manufacturing a lubricant consisting of coating particles of a solid lubricant with an oil in which it is not soluble and subsequently placing the particles so coated in an oil with which the coating-oil is not miscible.

5. The process of manufacturing a lubricant consisting of coating particles of graphite with oil and subsequently placing the particles so coated in an oil with which the coating-oil is not miscible.

6. The process of manufacturing a lubricant consisting of coating particles of graphite with castor-oil and subsequently placing the coated particles in an oil with which the castor-oil is not miscible.

Witness my hand this 28th day of September, 1901, in the presence of two subscribing witnesses.

WILLIAM F. DOWNS.

Witnesses:
HERMAN MEYER,
MABEL K. WHITMAN.